United States Patent
Beale

(10) Patent No.: US 7,293,119 B2
(45) Date of Patent: Nov. 6, 2007

(54) DMA DATA TRANSFER BETWEEN LOW-OVERHEAD PROCESSOR AND CONNECTED EXTERNAL CIRCUITRY USING TRANSACTIONS LOG

(75) Inventor: John Beale, Berkshire (GB)

(73) Assignee: Nokia Corporation, Espoo (FI)

( * ) Notice: Subject to any disclaimer, the term of this patent is extended or adjusted under 35 U.S.C. 154(b) by 421 days.

(21) Appl. No.: 10/500,116

(22) PCT Filed: Dec. 27, 2001

(86) PCT No.: PCT/EP01/15347

§ 371 (c)(1),
(2), (4) Date: Jun. 25, 2004

(87) PCT Pub. No.: WO03/065234

PCT Pub. Date: Aug. 7, 2003

(65) Prior Publication Data

US 2005/0114583 A1    May 26, 2005

(51) Int. Cl.
*G06F 13/28* (2006.01)

(52) U.S. Cl. .............................. 710/22; 710/23; 710/24; 712/244

(58) Field of Classification Search ............ 710/22–24; 712/244
See application file for complete search history.

(56) References Cited

U.S. PATENT DOCUMENTS

| 4,805,137 | A | 2/1989 | Grant et al. |
| 4,959,782 | A | 9/1990 | Tulpule et al. |
| 6,704,863 | B1 * | 3/2004 | Paul et al. ................... 712/244 |
| 6,708,291 | B1 * | 3/2004 | Kidder ........................ 714/39 |

FOREIGN PATENT DOCUMENTS

EP    0 908 830 A1    4/1999

* cited by examiner

*Primary Examiner*—Tammara Peyton
(74) *Attorney, Agent, or Firm*—Squire, Sanders & Dempsey, L.L.P.

(57) ABSTRACT

The present invention relates to a method and system for performing a data transfer between a shared memory (16) of a processor device (10) and a circuitry (20) connected to the processor device (10), wherein the data transfer is performed by triggering a DMA transfer of the data to the processor device, adding the DMA transfer to a transaction log, and providing the transaction log to the processor device, when the transaction log has reached a predetermined depth limit. The processor device is then informed of the DMA transfer of the transaction log, so as to be able to validate the transferred data. Thereby, significant background data movement can be provided without introducing high core overheads at the processor device (10).

11 Claims, 2 Drawing Sheets

DMA DATA TRANSFER BETWEEN LOW-OVERHEAD PROCESSOR AND CONNECTED EXTERNAL CIRCUITRY USING TRANSACTIONS LOG

FIELD OF THE INVENTION

The present invention relates to a method and system for performing a data transfer between a memory of a processor device, such as a digital signal processor (DSP), and a circuitry, such as an application specific integrated circuit (ASIC), connected to the processor device.

BACKGROUND OF THE INVENTION

Distributed memory architectures are very good at implementing data flow processing, and data flow processing is in turn what almost every DSP and related application boils down to. Ideal fit between DSP and data flow systems is further strengthened by the need for DSP application to run in real-time, i.e. they must process data with a specified throughput and/or latency requirement. Shared memory systems may have difficulties in guaranteeing latency due to the uncertainties over memory contention.

If the central processing unit (CPU) of a DSP has to stop its current task and move data on and off the chip, performance will be poor. Therefore, direct memory access (DMA) controllers are provided for executing command sequences, autoinitialization and the like. In real-time data processing systems, this allows the DMA to run independently of the CPU. DMA requires primarily that the DSP does not access the memory involved. To achieve this, the CPU may be stopped or decoupled from the bus system to assure that the CPU and the DMA controller are not attempting to access the memories concurrently. During the DMA operation, the addresses fed to the memories are those generated by the DMA controller. After the DMA operation is completed, the addresses generated by the CPU once again determine which memory word is being accessed. Thus, DMA provides a data transfer which allows data to be moved between a peripheral controller and a system memory without interaction of the host CPU. The data may be moved by the peripheral controller itself, or by a separate third party DMA controller.

The stopping or decoupling of the CPU is usually performed based on interrupt routines triggered by external circuitries which intend to access the shared memory of the DSP. Thus, high interrupt overheads and associated DSP core load are associated with frequent interrupt service routines (ISRs) triggered in case of data movements between the shared memory and external devices or circuitries connected to the DSP.

Document EP 0 908 830 A1 discloses a DSP-based communications adapter including a number of digital signal processors and network interface circuits for providing an attachment of a multi-channel telephone line. Each digital signal processor interrupts its host processor by transmitting an interrupt control block as data to a data memory of the host processor, and by subsequently sending an interrupt causing the host processor to examine the data memory. Thereby, a number of interrupts to the host processor from a single DSP is bundled and can be handled together. The overhead for individually handling each interrupt can thus be reduced. The interrupt blocks are written by means of a DMA operation to the memory of the host processor.

However, if this prior art solution is used for bundling interrupts of data movements between a shared memory of a DSP and an external circuitry, the CPU of the DSP still has to handle each interrupt of the interrupt block in order to trigger the corresponding ISRs required for data movement. Hence, overhead would still be a problem.

SUMMARY OF THE INVENTION

It is therefore an object of the present invention to provide a method and system for transferring data between a memory of a processor device and a circuitry connected to the processor device, by means of which interrupt overheads and associated core load can be reduced.

This object is achieved by a method of performing a data transfer between a memory of a processor device and a circuitry connected to the processor device, said method comprising the steps of:
  setting up a direct memory access (DMA) for transferring data at said circuitry;
  triggering a DMA transfer of said data to said processor device;
  adding said DMA transfer to a transaction log;
  providing said transaction log to said processor device when said transaction log has reached a predetermined depth limit; and
  informing said processor device of the availability of said transaction log.

Furthermore, the above object is achieved by a processor device having a memory which can be accessed by a connected circuitry, said processor device being arranged to validate data, transferred to said memory by a direct memory access, based on a transaction log provided to said processor device.

Additionally, the above object is achieved by an integrated circuit having means for providing access to a processor device, said integrated circuit being arranged to set up a direct memory access for transferring data via said access means, to trigger a DMA transfer of said data, to add said DMA transfer to said transaction log, to provide said transaction log to said processor device when said transaction log has reached a predetermined depth limit, and to issue an information indicating the availability of said transaction log.

Moreover, the above object is achieved by a system for performing a data transfer between a memory of a processor device and a circuitry connected to said processor device, wherein said circuitry is arranged to set up a direct memory access for transferring data, to trigger a DMA transfer of said data to said processor device, to add said DMA transfer to said transaction log, to provide said transaction log to said processor device when said transaction log has reached a predetermined depth limit, and to inform said processor device of the availability of said transaction log; and wherein said processor device is arranged to validate said transferred data based on said available transaction log.

Accordingly, a pre-programmed DMA located on interfaces hosted by the external circuitry is provided to transfer data between the memory and the external circuitry, wherein processor control requirements can be reduced by using the transaction log. Thus, a plurality of data transfers can be bundled with a single DMA operation, since the processor device may validate or qualify the transferred data based on the available transaction log, when the availability, e.g. transfer or interrogation, of the transaction log has been informed to the processor device. Since the processor device is only involved in the signaling of the information regarding the provision, e.g. transfer or interrogation, of the transaction log, interrupt overheads and associated core load can be significantly reduced. Furthermore, the need for manual data movement is prevented, and a data rate matching can be provided between the shared memory and the on-chip bus system of the external circuitry to thereby reduced stalling of the system.

Due to the fact that multiple data structures held in the memory can be validated using a single processor involvement, e.g. by an interrupt service routine, core processing overhead is reduced especially when context switching is required under a real-time operating system (RTOS). Furthermore, since the transaction log can be stored locally within the memory of the processor device, slow core polling of the transaction status within the external circuitry is not required. Significant background data movements are therefore allowed between the shared memory and the external circuitry, because means are provided for synchronizing and validating the data structures without high core overheads.

Preferably, steps b) and c) are repeated until said depth limit has been reached. Thereby, high amounts of data can be transferred by corresponding DMA transfers without interrupting the processor device. The DMA transfer may be triggered by hardware or software. The transaction log may be configurable or not.

The informing step may be performed by initiating an interrupt operation, e.g. triggering of an interrupt service routine at the processor device.

Furthermore, the transaction log may be transferred by an own DMA channel or may be appended to a data transfer. Alternatively, the transaction log my be retained in the connected circuitry, for interrogation following a qualifying interrupt.

BRIEF DESCRIPTION OF THE DRAWINGS

In the following, the present invention will be described in greater detail based on a preferred embodiment with reference to the drawing figures, in which.

DESCRIPTION OF THE PREFERRED EMBODIMENT

Figure 1:
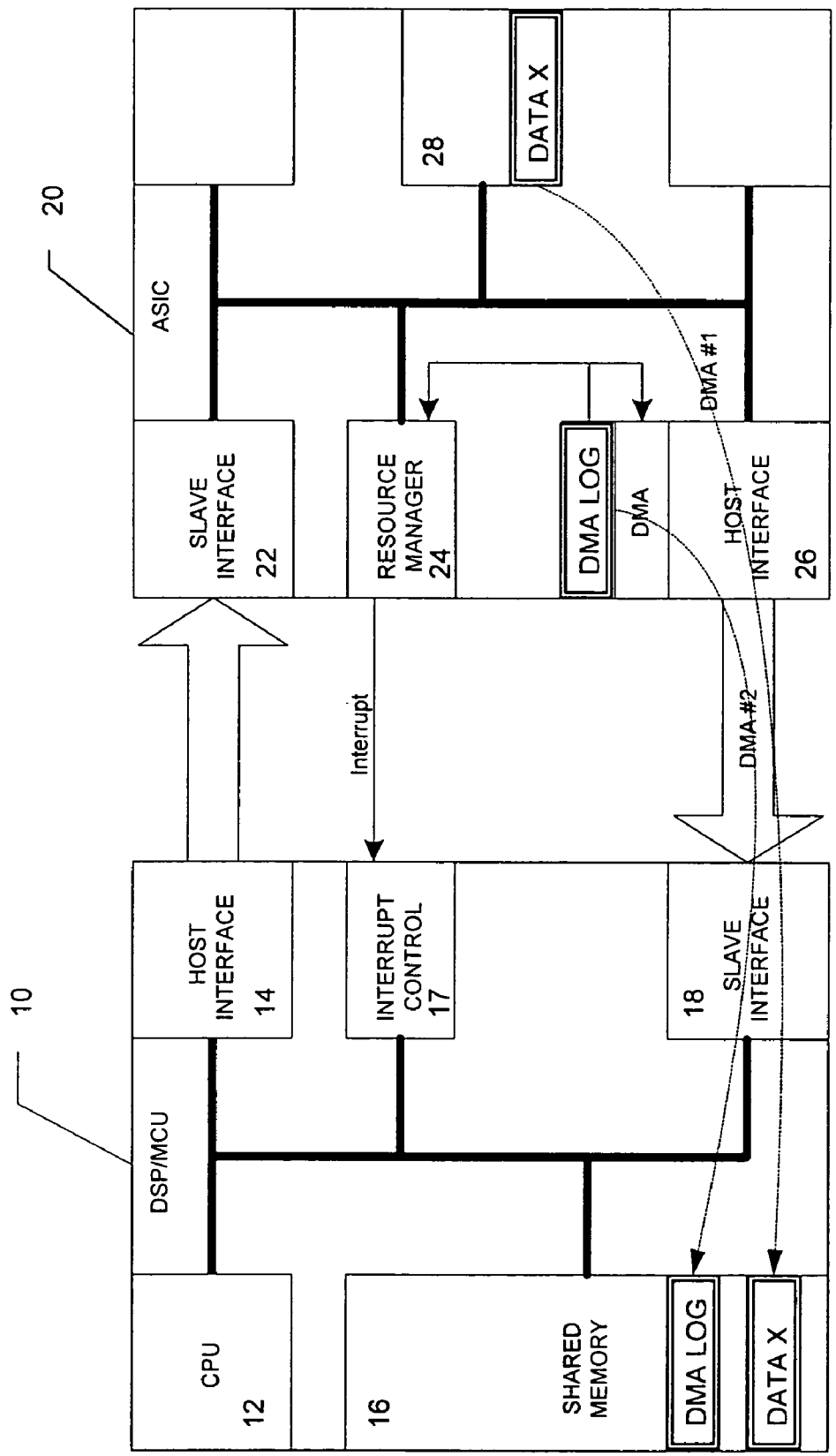
FIG. 1 shows a schematic block diagram of a digital signal processor connected to an ASIC.

The preferred embodiment will now be described based on a pre-programmed DMA located on an ASIC-hosted interface to provide a data movement between a shared memory 16 of a DSP or Microcontroller Unit (MCU) 10 and an ASIC 20, as shown in FIG. 1.

According to FIG. 1, the DSP 10 comprises a CPU 12 for controlling DSP operations based on a control program stored in a program memory (not shown). Furthermore, a host interface 14 is provided for controlling a data transfer to a slave interface 22 arranged at the ASIC 20. An interrupt control unit 17 is arranged in the DSP 10 to control the execution of interrupt service routines based on an interrupt control signal received from a resource manager 24 of the ASIC 20. Moreover, a slave interface 18 of the DSP 10 is controlled by a host interface 26 of the ASIC 20 so as to transfer data from the ASIC 20 to the shared memory 16 of the DSP 10.

In the ASIC 20, a memory 28 is provided for storing data to be transferred e.g. to the shared memory 16. The host interface 26 comprises a DMA controller for controlling DMA transfers via the slave interface 18 to the shared memory 16. Furthermore, a DMA transaction record or log comprising information about a DMA transfer history from the ASIC 20 to the DSP is stored at the host interface 26. The resource manager 24 is arranged to provide resource control of the ASIC 20 so as to enable the data transfer from the memory 28 to the host interface 26 under the control of the DMA controller.

As indicated by the dotted arrows in FIG. 1, a DMA transfer from the ASIC 20 to the DSP 10 comprises at least two phases, i.e. a first DMA transfer DMA #1 for transferring the respective data DATAX to the shared memory 16 of the DSP 10 and a directly or later following second DMA transfer DMA #2 for transferring the DMA transaction log from the host interface 26 to the shared memory 16. Thereby, high amounts of data can be transferred from the memory 28 of the ASIC 20 to the shared memory 16 of the DSP 10 by using DMA operations without involving the CPU 12. The CPU 12 is then informed of the data transfer by an interrupt control signal issued from the resource manager 24 to the interrupt control unit 17 after the transfer of the DMA transaction log.

Figure 2:
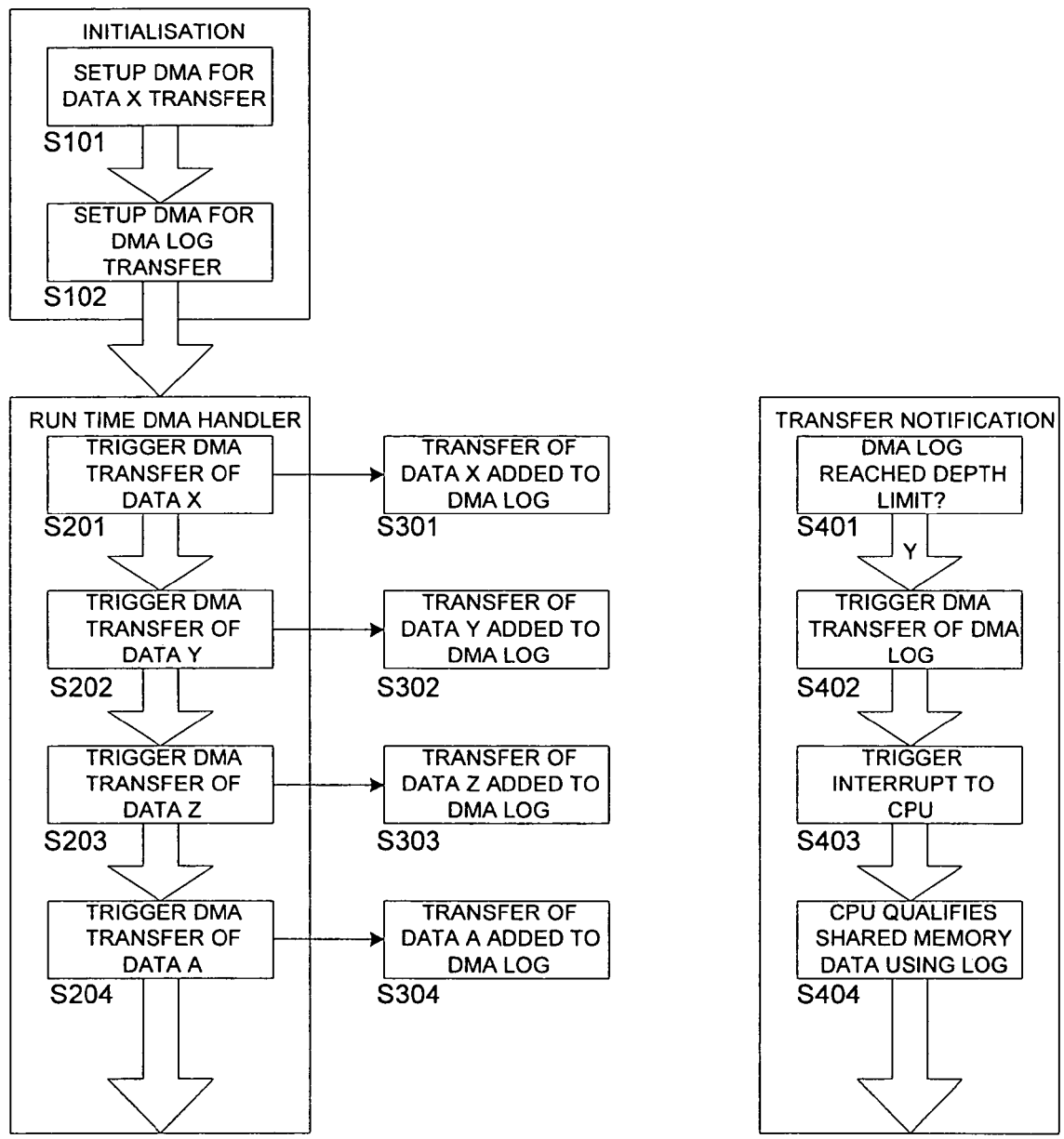
FIG. 2 shows flow diagrams of a data transfer method according to the preferred embodiment.

An example for a data movement from the ASIC 20 to the DSP 10 is now described based on the flow diagrams given in FIG. 2.

In an initialization phase the DMA for the transfer of first data DATAX is set up in the ASIC 20 in step S101. Then, a DMA for the transfer of the DMA transaction log is also set up in the ASIC 20 in step S102. Thereby, both DMA transfer operations required for the data movement from the ASIC 20 to the shared memory 16 of the DSP are initialized.

Then, a run-time DMA handling function is started at the DMA controller of the ASIC 20 to control the DMA transfer of the required amount of data. In step S201, the DMA transfer of the first data DATAX is triggered and an information indicating the transfer of the first data DATAX is added to the DMA transaction log (step S301). Similarly, subsequent DMA transfers of further data DATAY, DATAZ and DATAA are triggered in the subsequent steps S202 to S204, while the DMA transaction log is successively updated in steps S302 to S304. Thus, after the data transfer operation has been completed, the DMA transaction log contains transfer information specifying the data transferred to the shared memory 16 of the DSP 10.

When the DMA controller detects that the DMA transaction log has reached a predetermined depth limit, a transfer notification procedure is initiated by step S401. Then, a DMA transfer of the DMA transaction log is triggered in step S402 to transfer the DMA transaction log to the DSP 10 and store it in the shared memory 16. Then, the DMA controller triggers an interrupt to the CPU 12 of the DSP 10 by providing a corresponding control information to the resource manager 24 (step S403). In response to this interrupt, the CPU 12 qualifies or validates the data transferred to the shared memory based on the DMA transaction log also stored in the shared memory 16 (step S404). To achieve this, the interrupt control information supplied from the resource manager 24 to the interrupt control unit 17 may comprise a corresponding address information indicating the address of the DMA transaction log. The DMA transaction log may then comprise an information indicating the address ranges of the transferred data. The completion of the DMA movement in the transaction log may be indicated using DMA channel numbers The proposed processor interfacing concept thus allows significant background data movement between the ASIC 20 and the shared memory 16 without introducing high core overheads at the DSP 10.

It is noted that the present invention is not restricted to the preferred embodiment described above, but can be used for any DMA transfer between processor devices and other circuitries connected to the processor device. Furthermore, the signaling of the DMA transaction log to the DSP 10 may be performed by any signaling option and is not restricted to an interrupt operation. The DMA transfer may be performed to and from any memory-mapped location on the ASIC 20 or any other circuitry connected to the DSP 10. The transfer of the transaction log does not necessarily need its own DMA channel (e.g. DMA#2 in FIG. 1). It may be appended to a data transfer or may even by retained within the ASIC 20 for interrogation following a qualifying interrupt. This may include Interrupt Status. Thus, in FIG. 1, the DMA#2 is optional. The transaction log may be e.g. appended to the next data transfer. The DMA is not necessarily located on the host interface 26 of the ASIC 20, but may also hang on an ASIC OCB. Furthermore, the interrupt not necessarily has to be performed between two devices, but may also be triggered within the DSP 10. Thus, in FIG. 2, steps S102, S402 and S403 are optional steps for the specific case indicated in the configuration according to FIG. 1. The DMA transfer may be triggered also in software. The preferred embodiment may thus vary within the scope of the attached claims.

The invention claimed is:

1. A method comprising:
    performing a data transfer between a memory of a processor device and a circuitry connected to said processor device, wherein said performing comprises
    setting up at said circuitry a direct memory access for transferring data;
    triggering at said circuitry a direct memory access transfer of said data to said processor device;
    adding in said circuitry said direct memory access transfer to a transaction log;
    providing said transaction log from said circuitry to said processor device, when said transaction log has reached a predetermined limit; and
    informing said processor device of the availability of said transaction log.

2. A method according to claim 1, wherein said triggering and said adding are repeated until said limit has been reached.

3. A method according to claim 1, wherein said informing is performed by initiating an interrupt operation.

4. A method according to claim 3, wherein said interrupt operation initiates an interrupt service routine.

5. A method according to claim 1, further comprising validating said transferred data at said processor device based on said available transaction log.

6. A method according to claim 1, wherein said circuitry is an application specific integrated circuit.

7. A method according to claim 1, further comprising storing said transaction log in said memory.

8. An integrated circuit comprising:
    functionality configured to provide access to a processor device, wherein said integrated circuit is configured to set up a direct memory access for transferring data via said access means, to trigger a direct memory access transfer of said data, to add said direct memory access transfer to said transaction log, to provide said transaction log to said processor device when said transaction log has reached a predetermined limit, and to issue an information indicating the availability of said transaction log.

9. An integrated circuit according to claim 8, wherein said integrated circuit is configured to issue said information by triggering an interrupt.

10. An integrated circuit according to claim 8, wherein said integrated circuit is an application specific integrated circuit.

11. An integrated circuit comprising:
    performing means for performing a data transfer between a memory of a processor device and a circuitry connected to said processor device;
    setting means for setting up a direct memory access for transferring data at said circuitry;
    triggering means for triggering a direct memory access transfer of said data to said processor device;
    adding means for adding said direct memory access transfer to a transaction log;
    providing means for providing said transaction log to said processor device, when said transaction log has reached a predetermined limit; and
    informing means for informing said processor device of the availability of said transaction log.

* * * * *